(No Model.)

W. WHITE, Jr.
PACKING.

No. 337,100.  Patented Mar. 2, 1886.

Witnesses
E. B. Rankin
A. A. Connolly

William White Jr.
Inventor
by Connolly Bros
Attys.

United States Patent Office.

WILLIAM WHITE, JR., OF PITTSBURG, PENNSYLVANIA.

PACKING.

SPECIFICATION forming part of Letters Patent No. 337,100, dated March 2, 1886.

Application filed December 17, 1885. Serial No. 185,961. (No model.)

*To all whom it may concern:*

Be it known that I, WILLIAM WHITE, Jr., a citizen of the United States, residing at Pittsburg, in the county of Allegheny and State of Pennsylvania, have invented certain new and useful Improvements in Packings; and I do hereby declare the following to be a full, clear, and exact description of the invention, reference being had to the accompanying drawings, which form part of this specification.

This invention has relation to packings for pistons, valves, pipes, and for other uses to which packings are usually or may be applied, and has for its object the provision of a novel form of packing which shall possess all the requisites of an air-tight, fluid-tight, or liquid-tight seal, and which shall be susceptible of being fitted snugly into all positions or seats and of retaining its shape and position.

The value of both lead and india-rubber as packing materials is well understood and appreciated, and these materials have been combined in various ways for the purpose of making packings for vapors and liquids.

My purpose is to employ these materials or their substantial equivalents under novel conditions and to better advantage than they have been heretofore used.

My object in employing the lead is to provide a filling material or core which may be bent, flattened, or compressed into shapes corresponding to the seat or recess into which the packing is to be fitted, while I use the rubber as a covering or casing, and distinctly and specifically as a seal, which will be forced and held in place by the lead core.

My invention as distinguished from other packings composed of the same materials consists, essentially, of a core made of lead or other material which may be bent or compressed, and which is practically non-elastic, such core being in the form of a tube, so that it may be readily flattened or spread, and a covering or casing of rubber or other elastic material possessing qualities which especially adapt it to use as a close and effective seal.

The core and casing may be formed into a ring, or they may be of any desired shape, according to the specific use to which the packing is to be put.

Figure 1:
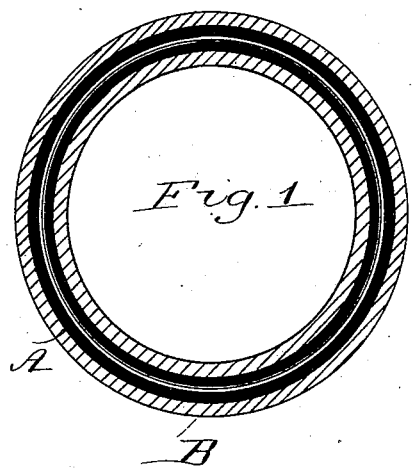
Figure 2:
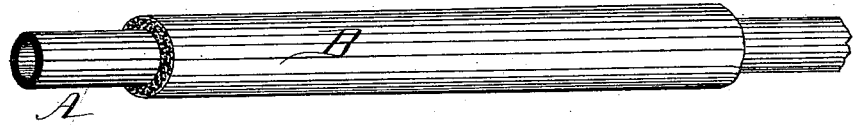

In the accompanying drawings, Figure 1 is a sectional view of a packing-ring; and Fig. 2, a side view of a form, which may be bent to any required shape.

A designates the lead core, of any suitable dimensions, but of tubular form; and B is the tubular casing, which consists of india-rubber—preferably pure rubber. When the packing is manufactured in the ring shape shown in Fig. 1, the ring will be unbroken, so as to avoid seams.

A packing made in conformity with my invention possesses obvious advantages. It may be packed or placed in positions for which other or elastic packings are not adapted and where a perfectly-tight packing is required. When subjected to the pressure of gland sections or caps, the lead core is spread or flattened, and thus caused to conform to the shape or surface upon or against which it rests while the rubber is closely pressed upon the joints, where it remains, held permanently and tightly in place by the core.

Having described my invention, what I claim, and desire to secure by Letters Patent, is—

1. As a new article of manufacture, a packing consisting, essentially, of a tubular practically non-elastic core capable of being bent or flattened and a casing or covering of elastic material adapted to constitute a seal, substantially as described.

2. As a new article of manufacture, a packing consisting of a tubular lead core incased in a tube of rubber, substantially as described.

In testimony that I claim the foregoing I have hereunto set my hand this 16th day of December, 1885.

WILLIAM WHITE, JR.

Witnesses:
THOS. A. CONNOLLY,
A. A. MOORE.